Dec. 29, 1925
J. J. POWER
1,567,383
DELIVERY MECHANISM
Filed August 17, 1923     2 Sheets-Sheet 1
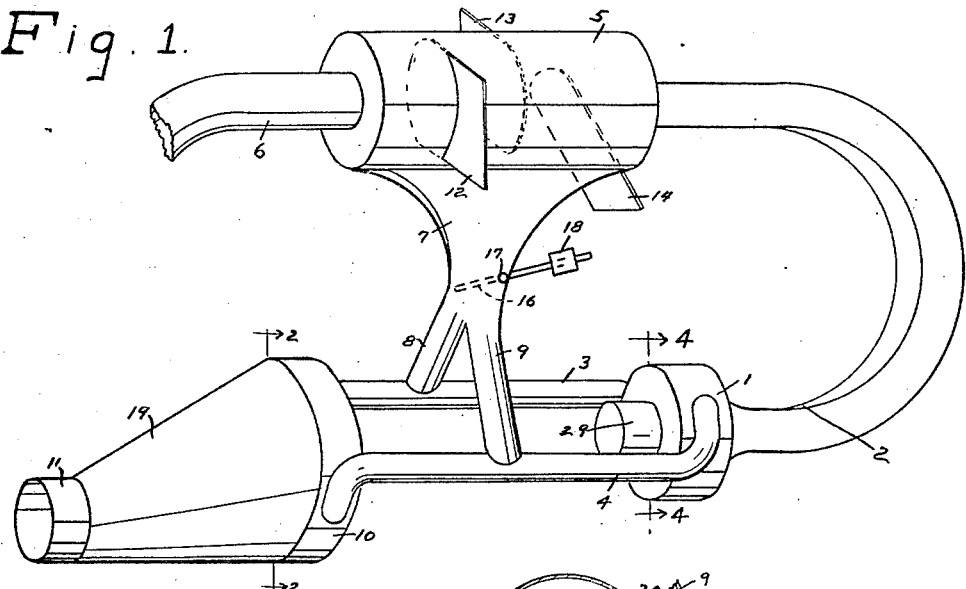
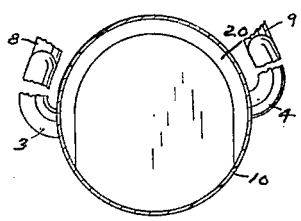
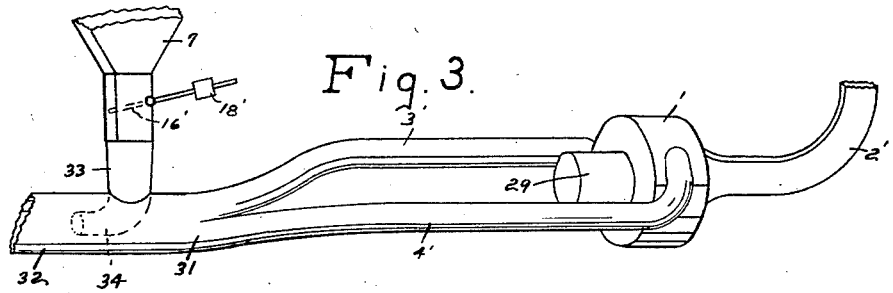
INVENTOR.
Jeffrey J. Power
BY
Edwin, Wheeler & Woolard
ATTORNEYS.

Dec. 29, 1925.

J. J. POWER 1,567,383

DELIVERY MECHANISM

Filed August 17, 1923    2 Sheets-Sheet 2

INVENTOR.
Jeffrey J. Power
BY
Erwin, Wheeler & Woolard
ATTORNEYS.

Patented Dec. 29, 1925.

1,567,383

UNITED STATES PATENT OFFICE.

JEFFREY J. POWER, OF MADISON, WISCONSIN, ASSIGNOR TO POWER-STEVENS FAN DEVICES COMPANY, OF MILWAUKEE, WISCONSIN, A CORPORATION OF WISCONSIN.

DELIVERY MECHANISM.

Application filed August 17, 1923. Serial No. 657,866.

*To all whom it may concern:*

Be it known that I, JEFFREY J. POWER, a citizen of the United States, residing at Madison, county of Dane, and State of Wisconsin, have invented new and useful Improvements in Delivery Mechanisms, of which the following is a specification.

This invention relates to a delivery apparatus and is particularly directed to apparatus which is adapted to receive material in a divided state, such for example, as grain, sand, and gravel, and similar material, and to deliver such material to any desired height.

In loading material, such for example, as grain, upon boats, it is the usual practice to employ several conveyors which mechanically carry the material along a trough or chute and discharge the material from one conveyor to another conveyor and thereafter into either a chute which leads directly into the hold of the boat or else to force this material thru a constricted opening into a fan casing and thereafter deliver the material into the hold of the boat. Two prominent features of this style of loading are to be noted, namely: the complicated and expensive equipment that is necessitated resulting in a needless multiplicity of parts and in a large expenditure of power, and also the tendency to subject the material being loaded to abrasion and cutting and grinding actions which are particularly destructive both to the material and to the apparatus, particularly so, when grain is being handled.

It is therefore an object of this invention to provide a delivery apparatus which will handle the material in such a manner that injury does not result either to the material or to the apparatus; to provide a delivery apparatus in which the material may be raised from any desired height and discharged at any desired height; and to provide a delivery apparatus in which the inlet and outlet conduits may be flexible and may be readily moved about even while the apparatus is in operation.

Other objects are to provide a delivery apparatus which is highly efficient in operation and which requires a small expenditure of power and to provide a delivery apparatus which is of simple design and sturdy construction, thereby minimizing the chances of the apparatus getting out of order.

Further objects are to provide a delivery apparatus in which a rotary discharge device is employed and in which the material is by-passed around such rotary discharge device thereby protecting both the rotary discharge device and the material from injury; to provide a rotary discharge device in which a single means is employed which secures both the circulation of the fluid by which the material is carried and also the actual travel of the material itself without subjecting the material to contact with the rotary discharge device; and to provide means for separating the material of greater density than the circulating fluid from the circulating fluid at one point in its travel and for recombining such material with the circulating fluid at another point in its travel.

Further objects are to provide a delivery apparatus which will deliver a blast of sand or similar material with sufficient force to be used for cleaning walls, removing paint, or other similar uses; to provide a delivery apparatus which is capable of handling plaster or cement and projecting such plaster or cement or material of this type against a wall with sufficient force to cause this plaster, cement or other material to adhere thereto, thus furnishing a ready and expeditious means for forming a permanent coat upon a wall, latticework, or similar structure; and to provide such an apparatus so arranged that the plaster, cement, sand or other material cannot clog the rotary discharge device.

Embodiments of the invention are shown in the accompanying drawing, in which:

Fig. 1 is a perspective view of the delivery apparatus.

Fig. 2 is a section on the plane 2—2 of Fig. 1.

Fig. 3 is a modified form of the delivery apparatus.

Figure 4:
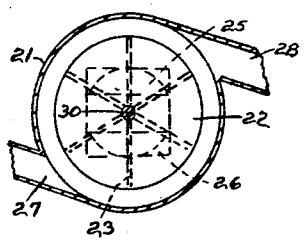
Fig. 4 is a fragmentary sectional view of the rotary discharge device, being a section taken on the plane 4—4 of Fig. 1.

Fig. 1 shows in perspective the association of parts which form the delivery apparatus. In this figure, the rotary discharge device is indicated generally at 1 and is provided with an inlet 2 and with a pair of discharge conduits 3 and 4. A separator 5 is interposed between the inlet 2 of the rotary discharge device and the main inlet 6 of the apparatus. This separator is provided with a downwardly converging lower portion 7 which branches into two conduits 8 and 9 which form by-passes and communicate with the outlets 3 and 4 of the rotary discharge device. These conduits 3 and 4 communicate with a collector, indicated generally at 10, which collector terminates in the main outlet 11.

The rotary discharge device sets up a violent circulation of fluid thru the apparatus, such fluid entering at the main inlet 6, passing thru the separator and there dividing; the major portion passing thru the conduit 2, thru the rotary discharge device, and the outlet conduits 3 and 4. A portion of the circulating fluid passes downwardly from the separator thru the conduits 8 and 9 joining the fluid passing thru the conduits 3 and 4 and passing together with such fluid into the collector 10 and outwardly thru the main outlet 11.

The separator 5 comprises a main cylindrical casing which is provided with a series of adjustable baffles 12, 13 and 14, and which terminates in a lower hopper or contracted portion 7. Each of the baffles may obviously be inclined downwardly as is the baffle 14. Thus it will be seen that material entering the separator thru the main inlet 6 will strike the baffles and be deflected into the hopper 7. This hopper 7 is provided at its constricted portion with a valve-like flap 16 which is pivoted at 17 and which has an outwardly extended weighted arm 18 which tends to keep the flap 16 in closed position. It will be seen that as long as the flap 16 is closed, it is impossible for air to circulate thru the closed circuit, that is to say, thru a portion of the separator, the inlet 2, the rotary discharge device 1, the conduits 3 and 4, and 8 and 9, and back into the separator. However, when sufficient material has accumulated within the hopper 7, the flap 16 moves downwardly about the pivot point 17 and discharges such material into the by-pass or conduit 8 and 9 and consequently into the discharge conduits 3 and 4 of the rotary discharge device. Altho the conduits 8 and 9 have been shown as uniting abruptly with the conduits 3 and 4, it is to be understood that such conduits 8 and 9 may extend downwardly into the conduits 3 and 4 and may be provided with projecting portions within such conduits 3 and 4 which extend in the direction of travel of the fluid in a manner similar to that which will be described in connection with the modification illustrated in Fig. 3.

The collector 10 comprises a cylindrical portion and a conically tapered portion 19 which terminates in an outlet 11. The conduits 3 and 4 enter opposite sides of the cylindrical portion and are arranged so that substantially the upper half of one and the lower half of the other are in alignment. This arrangement produces a cushioning effect for the material and also produces a rotary action within the collector, the material finally passing into the tapered portion 19 without being subjected to violent shock. If desired, the lower portion of the conical member 19 may be made substantially horizontal and also the upper portion of the cylindrical part may be provided with a flange 20 which terminates adjacent its lower portion, thereby leaving the cylindrical part smooth and unobstructed at all points along its line of union with the conical portion 19 adjacent the lower portion thereof.

Figure 5:
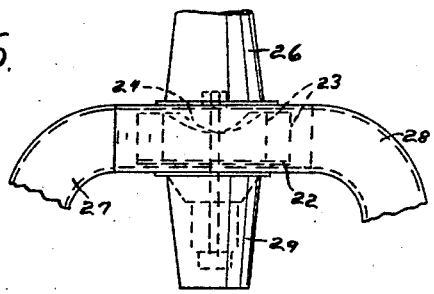
Fig. 5 is a plan view thereof.

The rotary discharge device is substantially similar to that disclosed in my Patent No. 798,699 of Sept. 5, 1905. It is, however, illustrated in Figs. 4 and 5 and comprises a substantially cylindrical casing 21 within which is housed the rotary member. This rotary member comprises a circular disk 22 and radial blades 23 mounted thereon, such blades having enlarged outer portions and narrow inner portions. The gradual curved outline of the outer faces of these blades is indicated in dotted lines at 24. The housing or casing 21 is provided with segmental openings 25 located at diametrically opposite points and communicating with a flaring inlet 26. The outlets are indicated at 27 and 28 and join the conduits 3 and 4 as shown in Fig. 1. A suitable motor (Fig. 1) is indicated at 29 and is directly connected with the shaft 30 of the rotary member. This motor 29 may conveniently be carried by one of the faces of the housing 21.

Fig. 3 shows a modified form of construction in which the collector is dispensed with and in which the conduits 3' and 4' unite and are merged into one conduit 31 which extends directly to the main outlet 32. In this form, the separator hopper 7 is continued downwardly into a single conduit 33 which projects into the conduit 31 and terminates in a projecting portion 34 which extends in the direction of travel of the material.

This last form of construction may be provided with a valve-like flap 16' similar to that previously described, or such flap may be dispensed with as the suction produced within the conduit 33 by the rapidly flowing fluid past the projection 34 may be made sufficient, by a proper proportioning of the parts, to prevent any possibility of undesirable internal circulation of the fluid.

Figure 6:
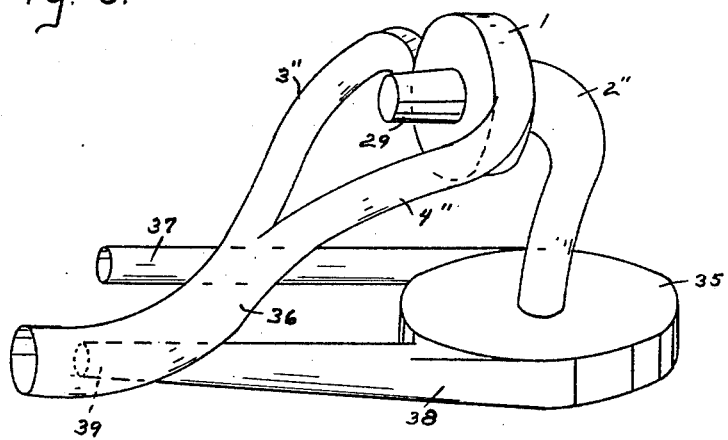
Fig. 6 is a perspective view of a further modified form of the delivery apparatus.

Fig. 6 shows a further modified form of construction in which the rotary discharge device 1 is mounted above a separator 35 of a different form from that previously described. In this form of the invention, the inlet 2″ of the rotary discharge device is in communication with the separator 35 at its central portion, and the outlets 3″ and 4″ of the rotary discharge device merge into a single conduit 36. In this form of the invention, the main inlet 37 is in direct communication with the cylindrical or disk-like separator 35, being tangentially arranged with reference to the separator. The separator outlet or by-pass conduit 38 is also in direct communication with the interior of the separator and tangentially arranged at a point diametrically opposite the point at which the main inlet 37 joins the separator. The conduit 38 extends into the conduit 36 and terminates in a projecting portion 39 which extends in the direction of travel of the fluid.

The separator 35 is a hollow cylindrical or disk-like member having a central outlet to which the suction conduit 2″ is joined. The interior surface of this separator is continuous and smooth and no obstructing members or baffle plates are provided.

In the operation of this last described form, the material is drawn into the main inlet 37 and, because of its greater density than the circulating fluid, is caused to separate out by centrifugal force and to arrange itself adjacent the inner periphery of the separator while allowing the circulating fluid to pass to the central portion thereof. As the material whirls around within the separator 35, it is guided outwardly into the tangential outlet 38 under the influence of centrifugal force and passes along such outlet conduit and into the main discharge conduit 36. It is to be noted that the tangential inlet of the separator sets up a whirling motion which is enhanced by the tangential outlet which extends in the opposite direction from the inlet. This outlet also has a portion of the fluid drawn therethru by the suction produced in the projecting portion 39. The material handled by this separator is offered an unobstructed free passage from the main inlet 37 to the main outlet 36.

It is to be understood that the main inlets and main outlets may be extended to any desired point either thru pipes or thru flexible hose and it is to be understood that they may be arranged at any desired relative elevation.

The forms of invention illustrated in Figs. 3 and 6, are particularly adapted for an apparatus which is intended to deliver a violent blast of sand or other material against a wall; for instance such sand blast may be used for cleaning a wall, removing paint, or other abrasive purposes. Also this apparatus may be used for projecting moist plaster or cement against a wall, latticework, or similar structure to form a permanent coat upon such wall, as the material will be driven by the violent outward blast with sufficient force to cause such material to pack in a uniform homogeneous manner. If desired, a separate water inlet may be provided in the outlet pipe in a manner somewhat similar to that in which the conduits 34, Fig. 3, and 39 Fig. 6, are arranged. In this case, the cement or plaster, or other similar material will be moistened as it leaves the apparatus. It is, however, within the scope of this invention to receive the moist plaster or cement at the inlet and deliver it from the apparatus at the outlet.

It will thus be seen that a delivery apparatus has been provided which is highly efficient in operation, which requires a minimum expenditure of power and which is of simple and sturdy construction, readily lending itself to a diversity of uses.

It will also be seen that a delivery apparatus has been produced in which the material handled thereby is not subjected to abrasion or other wearing or breaking action, and in which the rotary discharge device is protected from contact with the material handled by such apparatus.

I claim:

1. In a delivery apparatus; a rotary discharge device having a casing provided with an inlet conduit and a pair of opposite outlets extending tangentially therefrom, means for by-passing particles of solids carried by the fluids circulated by said device and delivering said particles to said outlets.

2. In a delivery apparatus; a rotary discharge device having a casing provided with an inlet conduit and a pair of opposite outlets extending tangentially therefrom, means for by-passing particles of solids carried by the fluids circulated by said device and delivering particles to said outlets, and a collector for recombining the fluids in said outlets.

3. In a delivery apparatus; a rotary discharge device having a casing provided with an inlet conduit and a pair of opposite outlets extending tangentially therefrom, means for by-passing particles of solids carried by the fluids circulated by said device and delivering said particles to said outlets, and a collector for recombining the fluids in said outlets and adapted to cause said recombined fluid streams to rotate within said collector.

4. In a delivery apparatus having a main inlet and a main outlet; a separator communicating with said inlet and outlet and a rotary discharge device for circulating fluids in said apparatus and having a casing provided with a pair of outlets extending tangentially therefrom and communicating with said main outlet.

5. In a delivery apparatus including a device for circulating fluids carrying particles of solids and having a main inlet and a main outlet; a separator comprising a portion of said main inlet, said separator being adapted to pass fluids longitudinally therethrough, and adjustable baffle plates extending into said separator and movable laterally thereof.

6. In a delivery apparatus including a device for circulating fluids carrying particles of solids and having a main inlet and a main outlet; a separator having its axis substantially coinciding with the axis of said main inlet, and adjustable baffle plates extending into said separator radially thereof.

7. In a delivery apparatus; a rotary discharge device having a pair of opposite outlet conduits extending tangentially therefrom, and a collector having a cylindrical portion provided with a main outlet, said outlet conduits communicating with said cylindrical portion upon opposite sides thereof, the axis of the communicating portion of one of said conduits being above the axis of the communicating portion of the other of said conduits whereby to cause rotation of fluids entering said collector.

8. The combination with a discharge device, of a collector casing having a portion substantially circular in cross section provied with a plurality of inlet ports in communication with said device, two of such ports being so disposed as to enter said casing in planes including minor chords of said portion, whereby to produce a vortex in said portion.

9. The combination with a centrifugal fan and a casing therefor having an inlet and a plurality of centrifugal outlets, of a separator having separate ports for fluid and solid delivery, said fluid delivery port communicating with the inlet, and a collector having communication with said outlet and with the solid delivery port of the separator.

10. In a delivery apparatus; a rotary discharge device having a casing provided with an inlet conduit and a plurality of outlets, means for by-passing particles of solids carried by the fluids circulated by said device and for delivering said particles to said outlets and a collector for recombining fluids in said outlets and adapted to cause said recombining fluid streams to rotate within said collector.

11. In a delivery apparatus including a device for circulating fluids carrying particles of solids and having a main inlet and a main outlet, a separator comprising a portion of said main inlet, said separator being adapted to pass fluids longitudinally therethrough and provided with means for deflecting particles laterally therefrom, a rotary fluid circulating device having an inlet communicating with said separator to receive fluids therefrom and a plurality of outlets communicating with said main outlet, and a by-pass communicating with said separator to receive solid particles therefrom and with said main outlet to deliver said solid particles to fluids expelled from said rotary circulating device.

JEFFREY J. POWER.